(12) United States Patent
Whelton et al.

(10) Patent No.: US 11,486,530 B2
(45) Date of Patent: Nov. 1, 2022

(54) METHODS AND SYSTEMS FOR TREATING EMISSIONS RELEASED DURING CLOSED MOLDING PROCESSES

(71) Applicant: Purdue Research Foundation, West Lafayette, IN (US)

(72) Inventors: Andrew James Whelton, West Lafayette, IN (US); John Alan Howarter, West Lafayette, IN (US); Brandon Emil Boor, West Lafayette, IN (US); Seyedeh Mahboobeh Teimouri Sendesi, West Lafayette, IN (US); Emily Conkling, Fruita, CO (US)

(73) Assignee: Purdue Research Foundation, West Lafayette, IN (US)

(*) Notice: Subject to any disclaimer, the term of this patent is extended or adjusted under 35 U.S.C. 154(b) by 443 days.

(21) Appl. No.: 16/604,091

(22) PCT Filed: Apr. 18, 2018

(86) PCT No.: PCT/US2018/028173
§ 371 (c)(1),
(2) Date: Oct. 9, 2019

(87) PCT Pub. No.: WO2018/195203
PCT Pub. Date: Oct. 25, 2018

(65) Prior Publication Data
US 2021/0102655 A1 Apr. 8, 2021

Related U.S. Application Data

(60) Provisional application No. 62/486,529, filed on Apr. 18, 2017.

(51) Int. Cl.
*F16L 55/165* (2006.01)
*E03F 3/06* (2006.01)
(Continued)

(52) U.S. Cl.
CPC .......... *F16L 55/1654* (2013.01); *E03F 3/06* (2013.01); *F16L 55/18* (2013.01); *G01N 15/06* (2013.01);
(Continued)

(58) Field of Classification Search
CPC ... G01N 2015/0046; G01N 2015/0693; G01N 15/06; F16L 55/1654; F16L 55/18; E03F 3/06
See application file for complete search history.

(56) References Cited

U.S. PATENT DOCUMENTS 5,431,715 A * 7/1995 Teague ................. B01D 53/002
                                                         95/67
5,458,663 A * 10/1995 Teague ................. B01D 53/002
                                                         96/57
(Continued)

FOREIGN PATENT DOCUMENTS

EP 0655271 A1 5/1995
JP 60-190860 9/1985

OTHER PUBLICATIONS

Ajdari, Elena Bourbour; "Volatile Organic Compound (VOC) Emission During Cured-in-Place-Pipe (CIPP) Sewer Pipe Rehabilitation," University of New Orleans; (2016); pp. 1-144; (see pp. 14, 27-30, 37, 54-64 and 86.
(Continued)

*Primary Examiner* — Craig M Schneider
*Assistant Examiner* — David R Deal
(74) *Attorney, Agent, or Firm* — Hartman Global IP Law; Gary M. Hartman; Domenica N. S. Hartman (57) ABSTRACT

Methods and systems for treating emissions during a cured-in-place pipe (CIPP) closed molding process in which a resin-impregnated fibrous material is placed within an existing fluid conduit and cured in situ to seal an opening in the
(Continued)

conduit. Such a method includes capturing multi-phase emissions released by a resin-impregnated fibrous material during curing thereof in a CIPP process, accumulating the multi-phase emissions, condensing at least a water portion of the multi-phase emissions, and treating vapor constituents of the multi-phase emissions.

18 Claims, 9 Drawing Sheets

(51) Int. Cl.
    *F16L 55/18*     (2006.01)
    *G01N 15/06*     (2006.01)
    *G01N 15/00*     (2006.01)
(52) U.S. Cl.
    CPC ............... *G01N 2015/0046* (2013.01); *G01N 2015/0693* (2013.01)

(56) References Cited

U.S. PATENT DOCUMENTS

| | | | |
|---|---|---|---|
| 5,668,735 A | | 9/1997 | Dominguez et al. |
| 2011/0180490 A1 | | 7/2011 | Gosselin |
| 2016/0078743 A1 | * | 3/2016 | Tanner ................. G08B 21/182 |
| | | | 348/160 |
| 2018/0003332 A1 | * | 1/2018 | Rosemont ............... B32B 27/32 |
| 2018/0354206 A1 | * | 12/2018 | Rosemont ............... F16L 55/18 |
| 2019/0063662 A1 | * | 2/2019 | Noggle .................... E05C 9/08 |
| 2019/0094101 A1 | * | 3/2019 | Spiegel ............... G01M 3/2876 |

OTHER PUBLICATIONS

International Search Report for PCT/US2018/028173, dated Jul. 27, 2018; 3 pages.

* cited by examiner

METHODS AND SYSTEMS FOR TREATING EMISSIONS RELEASED DURING CLOSED MOLDING PROCESSES

CROSS REFERENCE TO RELATED APPLICATIONS

This application claims the benefit of International Application No. PCT/US2018/028173, filed Apr. 18, 2018, having a priority claim to U.S. Provisional Application No. 62/486,539, filed Apr. 18, 2017. The contents of these prior patent documents are incorporated herein by reference.

STATEMENT REGARDING FEDERALLY SPONSORED RESEARCH

This invention was made with government support under Grant No. 1624183 awarded by the U.S. National Science Foundation. The government has certain rights in the invention.

BACKGROUND OF THE INVENTION

The present invention generally relates to technologies for capturing, identifying, analyzing, and addressing emissions that are potentially hazardous to the environment and humans.

Cured-in-place-pipe (CIPP) is a closed molding process commonly used to seal cracks, breaks, fissures, or other unwanted egresses in a wide variety of fluid conduits, including but not limited to pipes used in sewer, storm water, water treatment, drinking water, remediation, and industrial systems. CIPP generally entails chemically manufacturing a tubular member in situ within an existing pipe by placing a resin-impregnated fibrous material inside the pipe and then curing the resin to create a polymeric pipe that closes and seals the opening. Curing may be achieved by subjecting the resin-impregnated fibrous material to hot water, pressurized steam, and/or ultraviolet (UV) light, as well as other curing techniques, all of which are known in the art.

Resin systems used in CIPP processes include, but are not limited to, epoxy systems and styrene-based polyester and vinyl ester resin systems. Styrene has an IDLH (immediately dangerous to life and health) level of 700 $ppm_v$ and may be carcinogenic. Because CIPP is performed in the field, environmental contamination may occur if environmental conditions, forced air, pressurized steam, or human activities allow chemicals to be emitted into the worksite, adjoining pipes, and environment during setup, installation, and cleanup. However, CIPP processes are commonly considered to release only water vapor and gases that are not deemed to be hazardous to humans or the environment. As such, it is believed that measures have not been previously taken to prevent the release of emissions during CIPP processes.

Current monitoring approaches employed at CIPP job sites have used gas monitoring devices to monitor worksite chemical levels in the air to which humans are exposed. However, gas monitoring devices can typically only identify gas phase contaminants, are subject to water vapor interference, and believed to be incapable of detecting and analyzing individual constituents of complex multi-phase mixtures. In addition, though sorbent tubes and materials have been used at CIPP job sites to monitor worker exposure by absorbing gas-phase chemicals that are later desorbed in a lab for identification and quantification, such materials may be inappropriate for multi-phase mixtures and cannot be used to determine particulate or other possible emissions.

In view of the above, it is believed that systems do not exist that are adapted to capture complex multi-phase mixtures emitted by CIPP processes performed in the field.

BRIEF DESCRIPTION OF THE INVENTION

The present invention provides methods and systems suitable for treating emissions during a cured-in-place pipe (CIPP) closed molding process in which a resin-impregnated fibrous material is placed within an existing fluid conduit and cured in situ to seal an opening in the conduit. The invention is in response to a discovery that CIPP emissions are not limited to steam, water vapor, and air, but instead are complex multi-phase mixtures that contain organic solvents and partially cured resin particulate, among other materials, in addition to steam and water vapor.

According to one aspect of the invention, a method is provided that includes capturing multi-phase emissions released by a resin-impregnated fibrous material during curing thereof in a CIPP process, accumulating the multi-phase emissions, condensing at least a water portion of the multi-phase emissions, and treating vapor constituents of the multi-phase emissions.

According to another aspect of the invention, a system is provided for treating emissions during a cured-in-place pipe (CIPP) closed molding process. The system includes means for capturing multi-phase emissions released by the resin-impregnated fibrous material during curing thereof, means for accumulating the multi-phase emissions, means for condensing at least a water portion of the multi-phase emissions, and means for treating vapor constituents of the multi-phase emissions.

Technical aspects of the methods and systems described above preferably include the ability to determine and reduce exposure risks that exist at CIPP job sites by enabling real-time capturing of emissions and monitoring of constituents in the atmosphere at a CIPP job site.

Other aspects and advantages of this invention will be further appreciated from the following detailed description.

DETAILED DESCRIPTION OF THE INVENTION

The following describes methods and systems capable of treating emissions that occur during CIPP processes. Such emissions have been unexpectedly discovered to contain complex multi-phase mixtures that may contain organic solvents and partially cured resin particulate, among other materials. Such methods and systems will be described in reference to CIPP processes that generally involve placing a resin-impregnated fibrous material, typically in the form of a tube, within an existing pipe or other fluid conduit (nonlimiting examples of which include pipes used in sewer, storm water, water treatment, drinking water, remediation, and industrial systems), and then curing the resin-impregnated fibrous material in situ to seal an opening (as nonlimiting examples, a crack, break, fissure, or other unwanted egress) in the conduit. Although the invention will be described hereinafter in reference to CIPP processes, it will be appreciated that the teachings of the invention may also be generally applicable to other types of repair procedures that are performed at job sites. Furthermore, although the invention will be described hereinafter in reference to particular devices or functions schematically identified in the drawings, it should be noted that the teachings of the invention are not limited to these particular devices or functions, and the invention does not require all of the devices, functions, or interfunctionality represented in the drawings.

Figure 1:
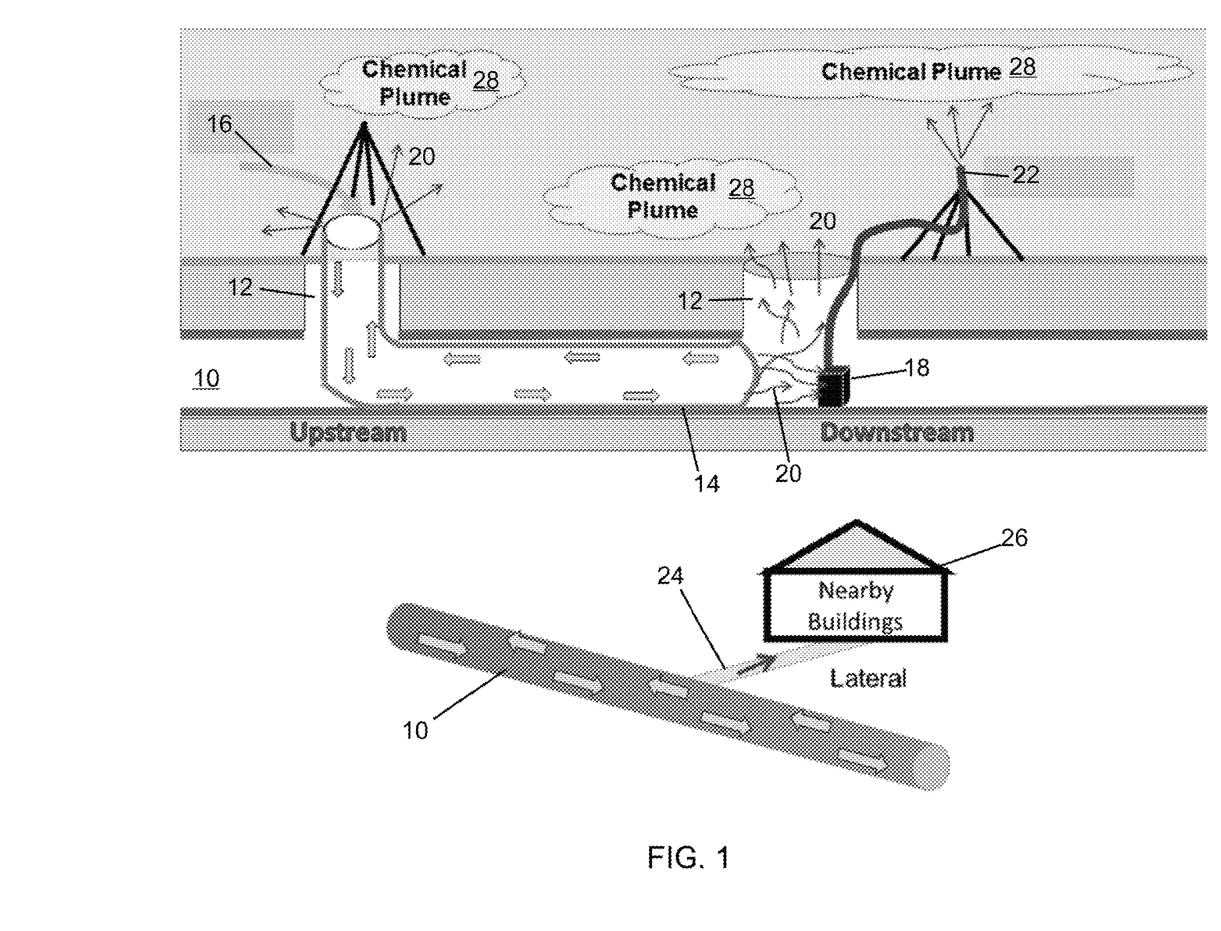
FIG. 1 is a diagram schematically illustrating locations where emissions that contain complex multi-phase mixtures may typically occur at a job site where a CIPP process is being performed.

FIG. 1 is a diagram schematically illustrating a job site where a CIPP process is being performed. In particular, FIG. 1 represents a buried "host" pipe 10 with surface access points provided by two manholes 12, a resin-impregnated fibrous tube 14 placed in a portion of the pipe 10 between the manholes 12, and water, steam, and/or forced air 16 entering the fibrous tube 14 at one of the manholes 12 (located "upstream" in FIG. 1) for the purpose of curing the tube 14 (though other curing techniques may be used). FIG. 1 shows an optional ventilator 18 placed in the pipe 10 as a conventional technique for removing emissions from the pipe 10, as nonlimiting examples, water vapor and gases that are commonly assumed to be released by CIPP processes and also assumed to be harmless. Water vapor and gas emissions 20 drawn from the tube 14 by the ventilator 18 are released to the aboveground atmosphere through the outlet of an optional exhaust pipe 22. Alternatively, such emissions 20 may simply be allowed to exit the end of the tube 14 and escape the pipe 10 through the downstream manhole 12, or fans (not shown) may be utilized to direct the emissions 20 away from the worksite. FIG. 1 represents that there are multiple locations where the emissions are likely to occur at the job site, including the interior of the resin-impregnated fibrous tube 14, annular spaces between the tube 14 and pipe 10, through the manholes 12, through the outlet of the exhaust pipe 22, and in some cases through lateral runs 24 that connect the pipe 10 to nearby buildings 26. The emissions 20 at times may, but are not always, detectable by an odor and/or take the form of a visible chemical plume 28, including but not limited to the particular resins utilized in the fibrous tube 14.

Figure 2:
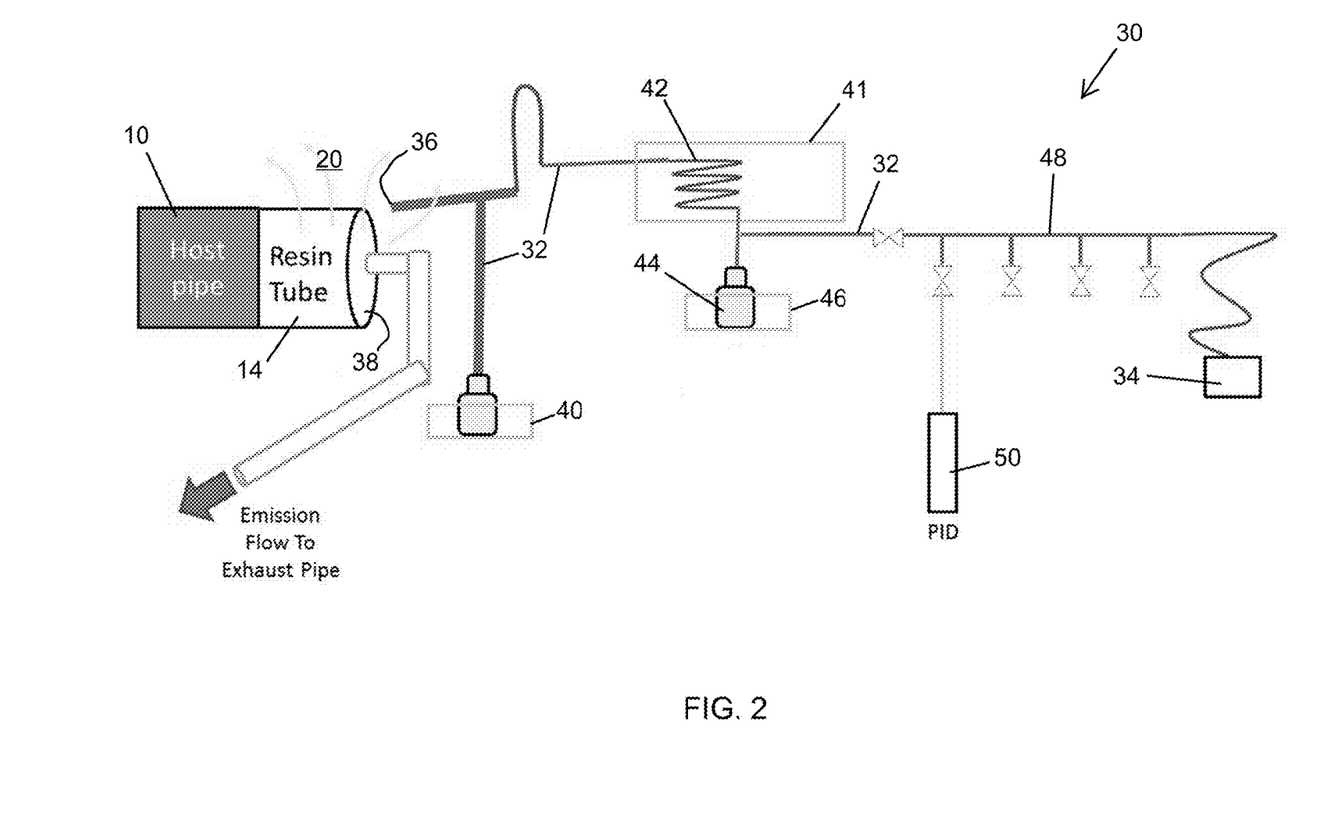
FIG. 2 schematically represents a nonlimiting embodiment of a system for capturing and treating emissions released by a CIPP process, for example, at a job site as represented in FIG. 1, in accordance with a first aspect of the invention.

FIG. 2 schematically represents a nonlimiting embodiment of a system 30 for capturing and treating emissions released by a CIPP process, for example, the emissions 20 released at a job site as represented in FIG. 1. The system 30 is represented as capturing multi-phase emissions 20 (e.g., vapors, droplets, particulate, etc.) released from the end of the fibrous ("resin") tube 14, though the system 30 could capture emissions 20 from essentially any location including those indicated in FIG. 1, for example, capturing any or all emissions 20 emitted from the outlet of the exhaust pipe 22. The system 30 includes piping 32 that is preferably constructed of one or more materials that are chemically resistant to chemicals and elements to which the system 30 will be exposed at CIPP job sites. A vacuum pump 34 is coupled to the piping 32 to draw the emissions 20, air, etc., into the piping 32 through its inlet 36 positioned at an end 38 of the fibrous tube 14. A suitable pumping rate is about 0.5 liters per minute, though lower and higher rates are foreseeable. The mixture of air and emissions 20 drawn into the piping 32 pass through one or more multi-stage cooling chambers that serve to condense the mixture and its constituents, and at least in part condense water vapor in the emissions 20 prior to remaining constituents in the emissions 20 being detected and quantified. The cooling chambers are represented in FIG. 2 as comprising an ice bath 40 and a cooler 41 containing a coil 42 through which the mixture flows, though a cold trap of a type commonly used with vacuum pumps and/or one or more other chilling devices could additionally or alternatively be used, including but not limited to one or more liquid nitrogen chillers. The cooling capacity and total volume of the cooling chamber(s) is variable based on the anticipated flow rate of emissions 20. A collection vessel 44 enclosed in a cooler 46 traps the resulting condensate (e.g., water) while the continuous piping 32 transports uncondensed vapor to additional material collection devices located downstream of the cooling chamber(s). The remaining uncondensed vapor is directed via a manifold 48 to a photoionization detector (PID) 50 to detect constituents of the emissions 20 and relative quantities of the constituents. The PID 50 may sample the mixture at any suitable rate, for example, every two seconds. Filters of types known in the art can be used as humidity filters at the inlet to the PID 50. Alternatives to the system configuration shown in FIG. 2 include the use of receptacles, for example, glass vials, Tedlar bags, sorbent tubes, charcoal, etc., to collect the gas mixtures and/or condensates.

For the purpose of analyzing particulates captured with a system such as that shown in FIG. 2, various different techniques may be utilized, for example, thermogravimetric analysis (TGA), differential scanning calorimeter (DSC) analysis, and nuclear magnetic resonance (NMR) spectroscopy.

In investigations leading to the present invention, studies were conducted at multiple locations where steam-cured CIPP processes were being performed. During these studies, monitoring systems were employed that were equipped with a PID similar to what was discussed in reference to FIG. 2. Intermittently, the systems unexpectedly detected high chemical emissions, in one instance represented in FIG. 3A as high as 6231 ppm$_v$. These emissions, which were sometimes transient, were not always associated with a visible chemical plume. Gas chromatography-mass spectrometry (GC/MS) analysis indicated the presence of styrene, other volatile organic compounds (VOCs), and semi-volatile organic compounds (SVOCs). The emissions were further determined to be a complex multi-phase mixture of organic vapors (solvents), water vapor, particulate (condensable vapor and partially cured resin), and liquid droplets (water and organics).

For the investigations, a variety of analytical standards were used to examine GC/MS results. These included 1,4-dichlorobenzene-d4 (CAS #3855-82-1), butyl hydroxyl toluene (CAS #128-37-0), benzaldehyde (CAS #100-52-7) and styrene ≥99% that contained 4-t-butylcatechol stabilizer (CAS #100-42-5) purchased from Sigma-Aldrich, and the development of calibration curves for styrene (hexane, $R2=0.999$), styrene (methylene chloride $R2=0.998$), benzaldehyde (methylene chloride, $R2=0.995$) and butylated hydroxyl toluene (BHT) (methylene chloride, $R2=0.995$). The following were also developed or used during the investigations: solvent extraction methods for examining uncured resin tubes, GC/MS methods for analysis of Tedlar bag air samples and resin tube extracts, sorbent tubes to confirm chemicals were captured, thermogravimetric analysis (TGA) and differential scanning calorimetry (DSC) methods to analyze materials emitted into air, and proton nuclear magnetic resonance (proton NMR, hydrogen-1 NMR, or $^1$H NMR) spectroscopy methods for analysis of particulates.

The investigation included CIPP processes performed on various types of pipe, including vitrified clay sanitary sewer pipes, corrugated metal culverts, and concrete storm water culverts. The CIPP processes were performed with fibrous tubes impregnated with various resins, including a polyester/vinyl ester-based resin reported to contain 38-47% wt. polyester/vinyl ester resin, 0-2% wt. amorphous fumed silica, 15-31% wt. styrene, 0.5-0.7% wt. of various organic peroxides, 0-20% wt. fiberglass, and 0-22% wt. of proprietary filler. Other fibrous tubes were impregnated with an isophthalic-based polyester resin reported to contain 32.0% wt. styrene and 0.5% Trigonox® KSM and 1% di-(4-tert-butyl-cyclohexyl) peroxydicarbonate as initiators, or a high molecular weight isophthalic unsaturated polyester resin of unknown composition, or a vinyl ester resin of unknown composition.

At some locations, emissions were monitored near locations at manholes upstream and downstream of the CIPP process, or immediately above a section of the resin-impregnated fibrous tube, or other locations of interest. Due to the different resins present in the fibrous tubes, various complex multi-phase mixtures of organic vapors (solvents), water vapor, particulate (condensable vapor and partially cured resin), and liquid droplets (water and organic) were detected before, during, and after the CIPP processes were performed. PID measurements indicated that chemical exposure was a function of location at and outside the installation site, the type of CIPP activity taking place (tube insertion, curing, post-curing), wind condition, and nearby vehicle traffic. During steam curing, when a visible (white) chemical plume exited the downstream manhole, spot PID readings reached 19.5 ppm$_v$ in the vicinity of the operation, and a spot PID reading of 514 ppm$_v$ was recorded about 4.5 m from the exhaust pipe 22 during curing. At another installation, a PID located a few centimeters directly above an uncured tube reached a reading of 1361 ppm$_v$ while a white material was observed being emitted into the air.

Figure 3A:
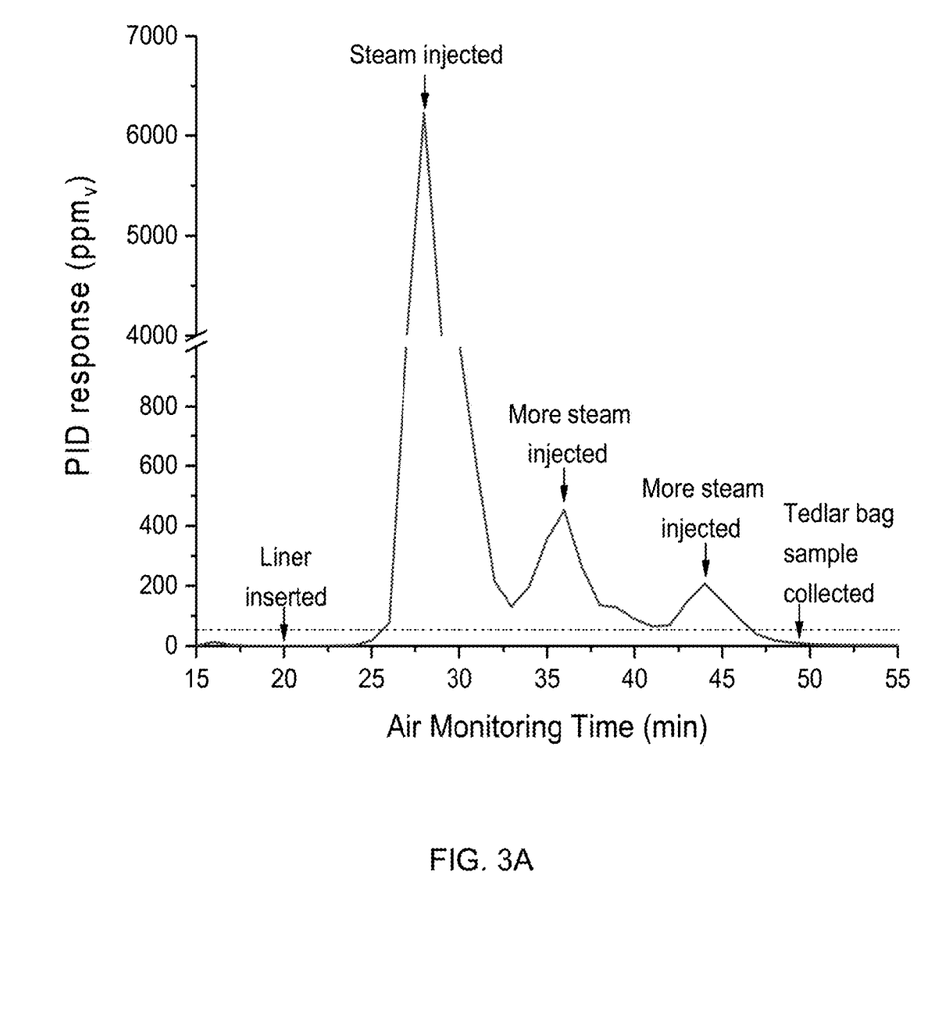
FIG. 3A is a graph plotting photoionization detector (PID) results obtained by capturing and analyzing samples of emissions released at a job site where a CIPP process was being performed.
Figure 3B:
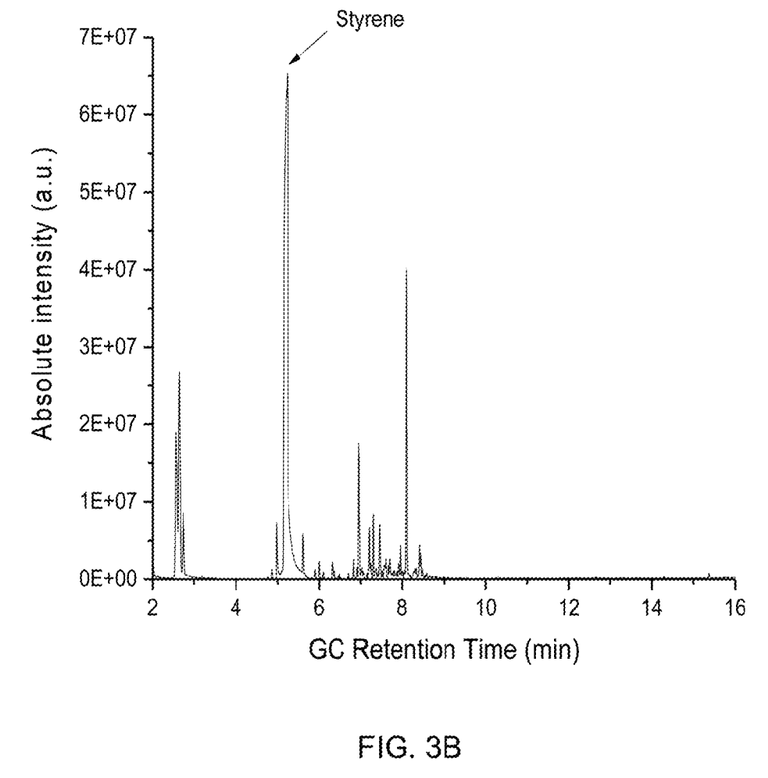
FIG. 3B is a chromatogram plot representing chromatography (GC) analysis of an emission sample evidencing VOCs present in the sample.

FIG. 3A is a graph plotting results obtained by capturing and analyzing emissions released at a job site where a CIPP process was being performed with one of the styrene-based polyester resin systems on a sewer pipe. FIG. 3B is a chromatogram plot representing GC analysis of a Tedlar bag air sample collected at about fifty minutes, and shows styrene (retention time 5.2, min) and peaks of other VOCs present in the sample. The PID signal increase corresponded to forced air introduction into the resin tube, before steam was introduced under pressure. A Tedlar bag sample was collected near the end of the curing period and GC/MS results showed styrene and some unidentified volatile compounds were emitted.

Figure 4:
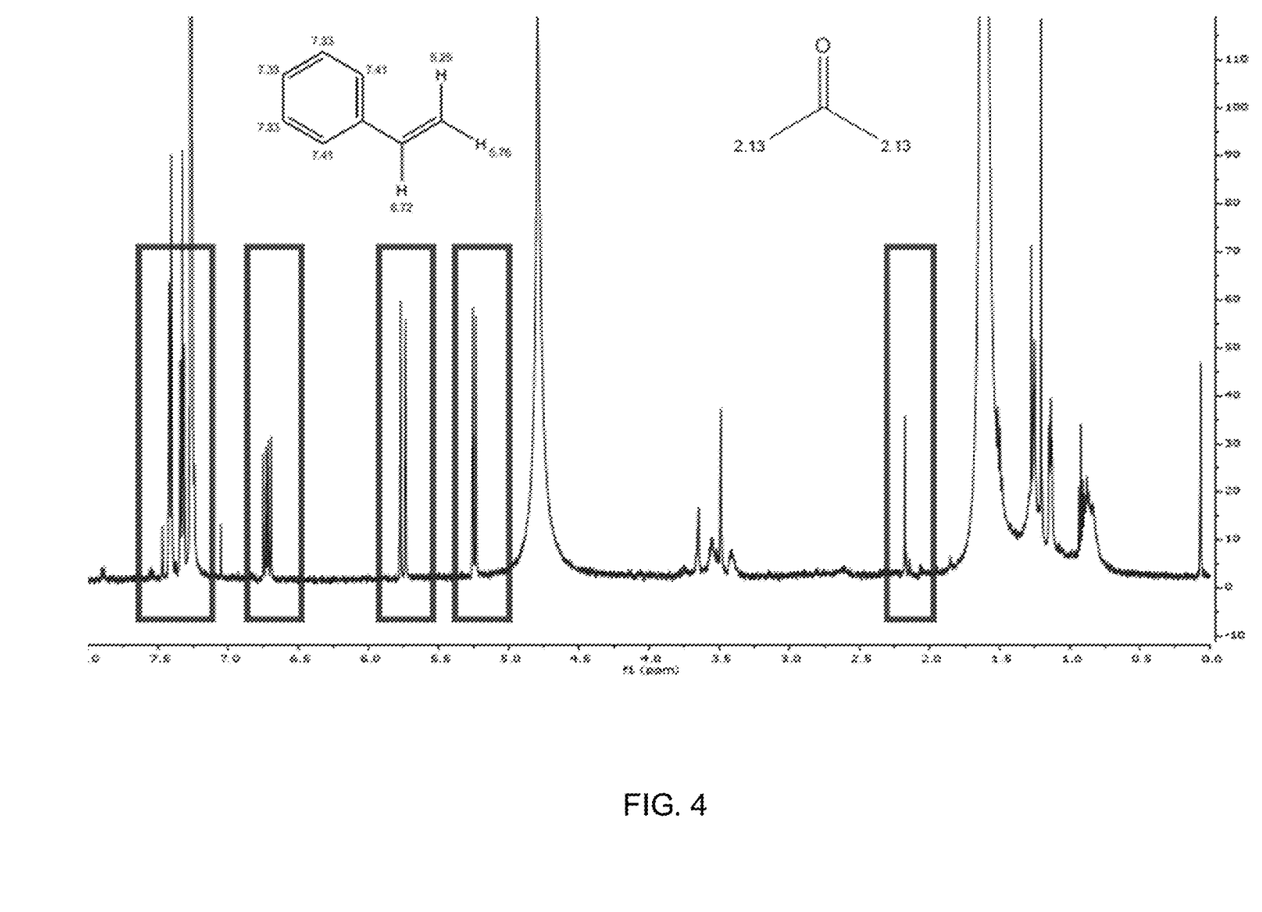
FIG. 4 is a graph plotting results obtained using nuclear magnetic resonance (NMR) spectroscopy to analyze particulate that had been captured at a job site where a CIPP process was being performed.
Figure 5A:
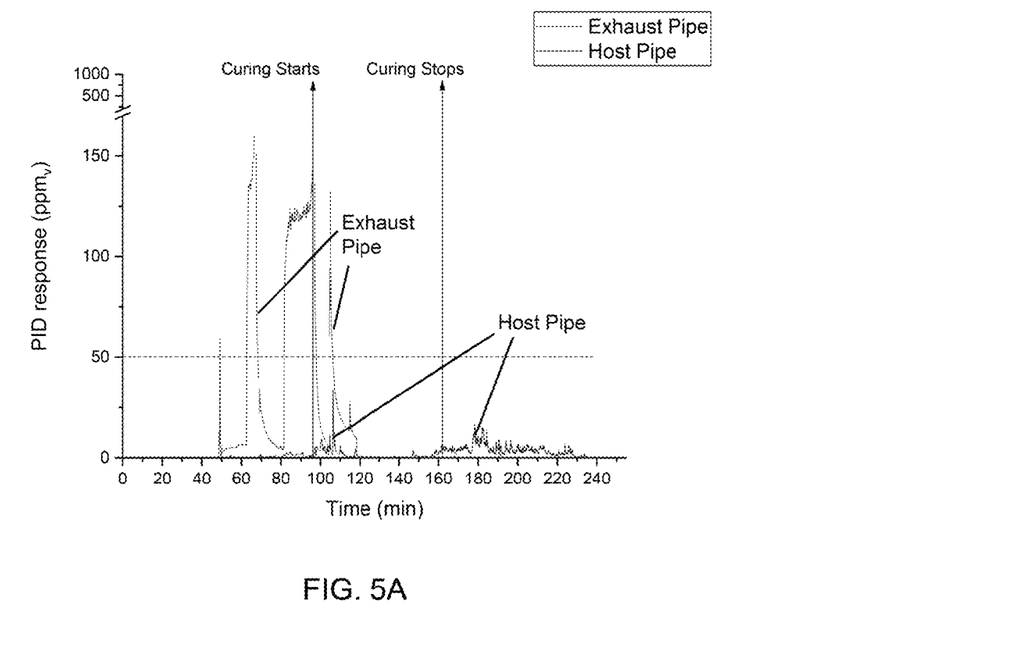
FIGS. 5A through E contain five graphs plotting PID results obtained by capturing and analyzing emissions released at different job sites where CIPP processes were being performed.
Figure 5B:
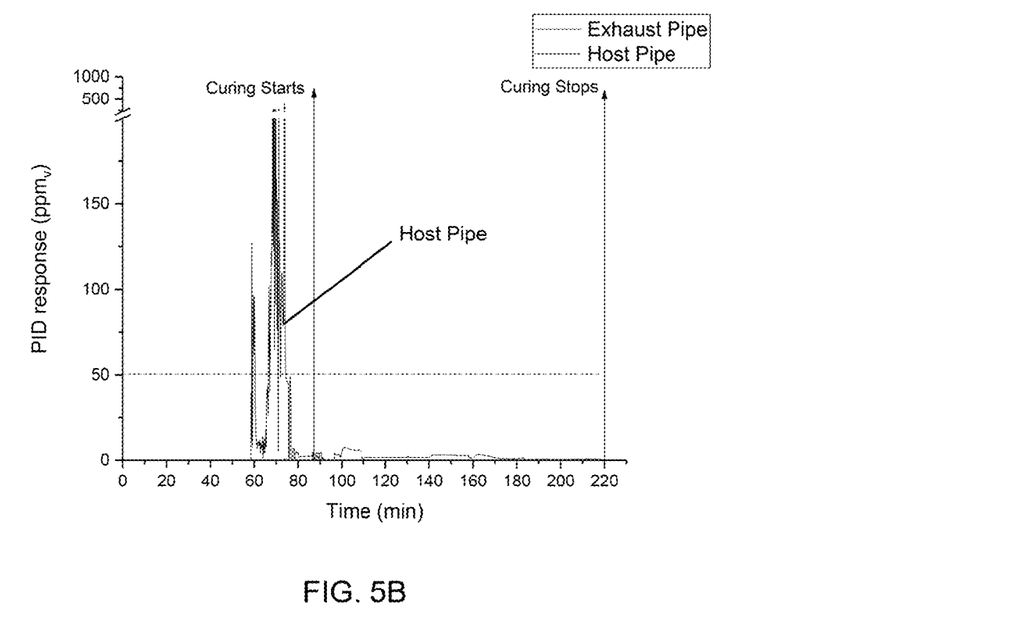
Figure 5C:
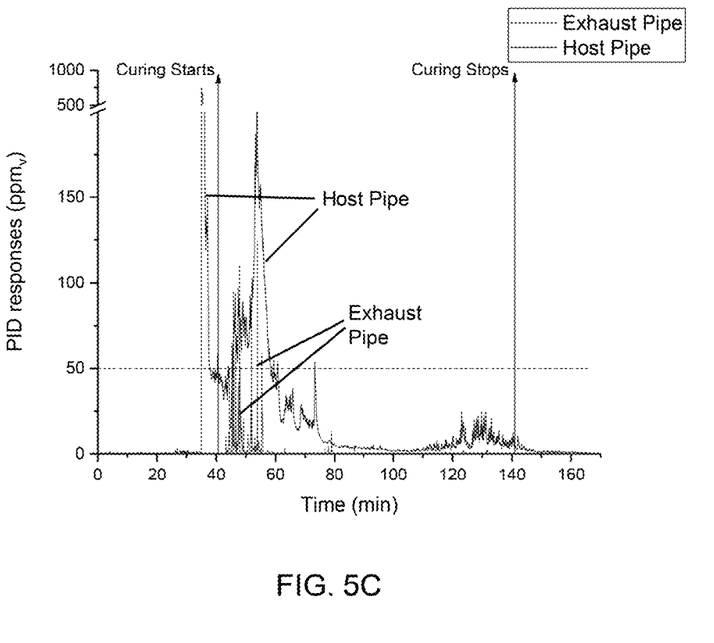
Figure 5D:
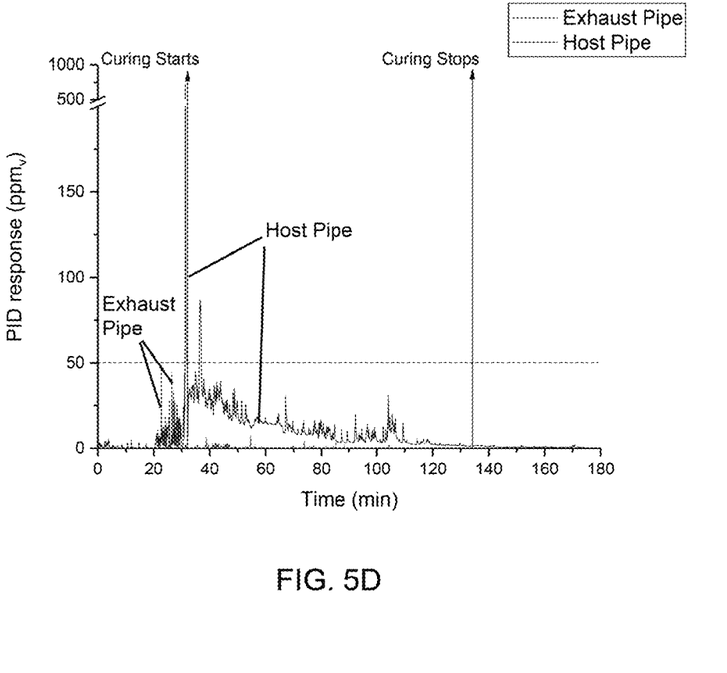
Figure 5E:
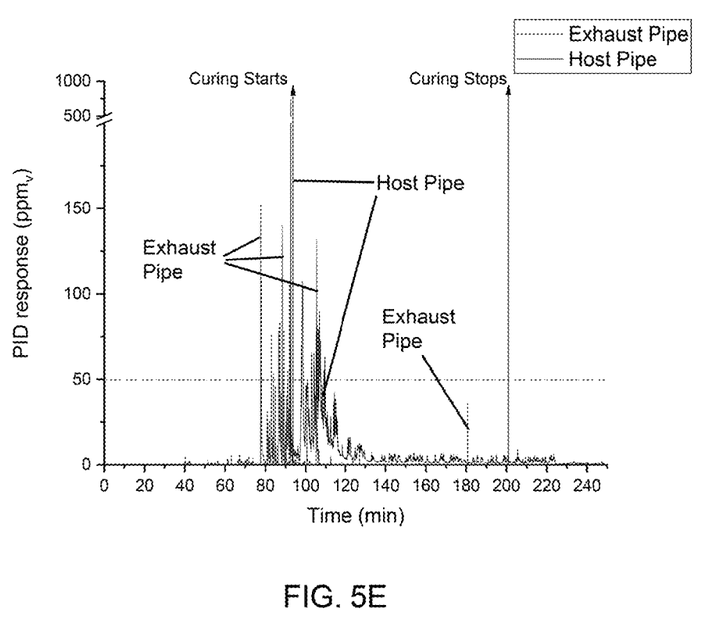

At some locations using a styrene-based polyester and vinyl ester resin system, emissions that were captured by a cold condenser were determined to be complex multi-phase mixtures of organic vapor that was extracted from the resin and volatilized along with steam, which was acting as the extractant and carrier medium. At room temperature, the condensate partially phase separated into a colorless liquid floating on top of a dense cloudy liquid. When a drop of the colorless liquid was placed in a fume hood bench, it evaporated much faster than a water droplet, indicating VOC presence. The dense cloudy liquid was separated (fractionated) by centrifugation (3500 RPM, 15 min) into two colorless liquid phases and a white waxy solid that formed the lightest top layer. TGA demonstrated that the waxy solid evaporated fully at 90° C. with volatilization occurring immediately at the onset of heating at 30° C. DSC curves showed three characteristics endothermic peaks at 2° C. (melting), 42° C. (evaporation), and 77° C. (evaporation). The results from the thermal analysis indicated that the waxy solid was likely a mixture of low molecular weight volatile organic material with minimal presence of water or inorganic materials. To further investigate the composition of the waxy solid condensate, $^1$H NMR was performed. The chemical shifts for material extracted from the soft waxy phase indicated the presence of styrene monomer and ethyl acetate as shown in FIG. 4. Styrene monomer was identified by the characteristic chemical shifts at 7.2 to 7.4, 6.7, 5.7 and 5.2 ppm. Acetone was identified by the chemical shift at 2.15 ppm. The prominent chemical shift at 4.7 ppm is from deuterated water. Multiple chemical shifts are present between 0-2.0 ppm, which were not identified.

PID results differed greatly for low VOC CIPP installations that used a vinyl ester resin system as the impregnation resin, as compared to installations that used a styrene resin system. FIGS. 5A through 5E contain five graphs plotting PID monitoring results obtained from emissions drawn from the host pipe outlet and exhaust pipe at five different installations, In FIGS. 5A through 5E, it can be seen that several "out of range" events were detected, indicating the PID signal exceeded 9999 ppm$_v$. Again, the system captured multi-phase material mixtures that included, but were not limited to, organic vapor, water vapor, and particulate. The CIPP installations that utilized a low-VOC vinyl ester resin system had the lowest PID response (max 9.6 ppm$_v$), whereas CIPP installations that utilized a styrene-based resin had much higher responses (394 to 757 ppm$_v$). For the styrene-based resin, lower maximum PID levels were recorded at the exhaust pipe compared to the host pipe due to the exhaust pipe being located farther away from the emission point such that greater mixing and dilution with ambient air likely occurred.

Results of the investigation reported above provided a better understanding of materials emitted during CIPP processes. Capture and analysis of condensed materials revealed that chemical plumes characteristic of CIPP processes were complex multi-phase mixtures containing organic vapor, water vapor, particulate (condensable vapor and partially cured resin), and liquid droplets (water and organics). The nature of captured partially-cured resin was unclear because of the extent of polymerization, side reactions, and role of environmental conditions on its formation were not studied. Detected VOCs and SVOCs were not limited to styrene, and in some investigations tripropylene glycol diacrylate (TPGDA) and/or other VOCs or SVOCs were detected. PID monitoring results indicated that chemical emissions of additional compounds were at levels that may merit monitoring.

Figure 6:
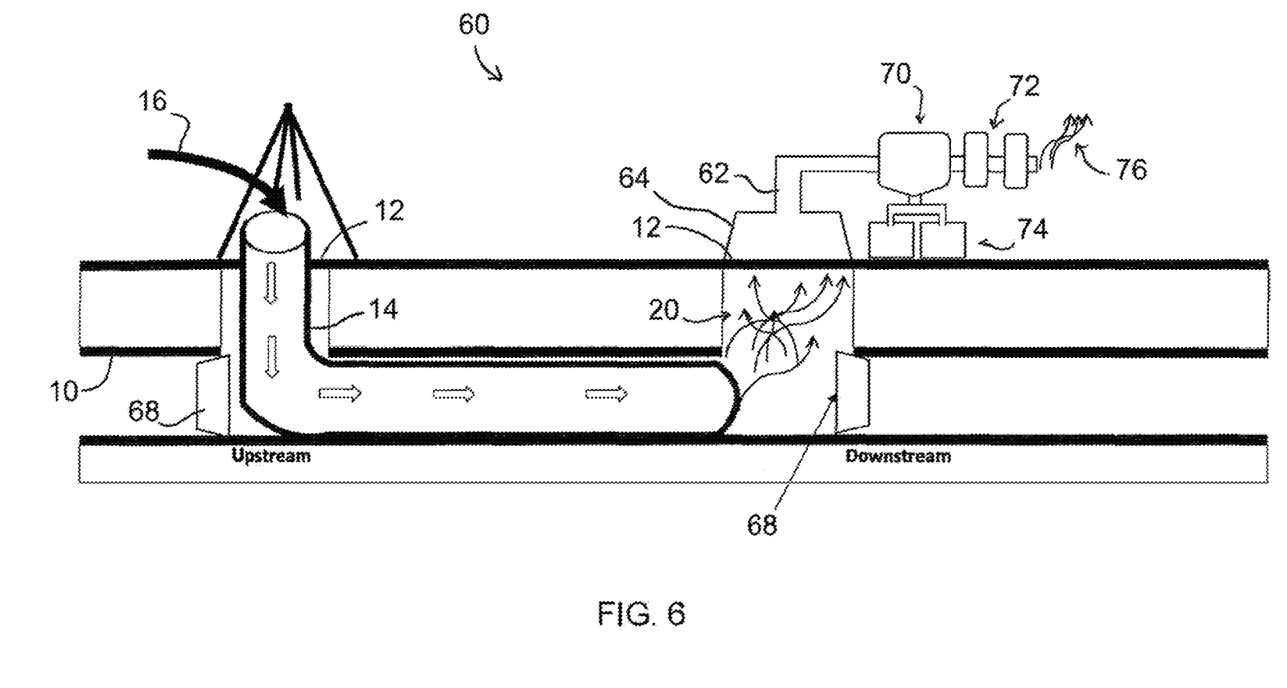
FIG. 6 schematically represents a nonlimiting embodiment of a system for capturing and treating emissions released by a CIPP process, for example, at a job site as represented in FIG. 1, in accordance with a second aspect of the invention.

In view of the above, it can be appreciated that a system for capturing emissions to prevent hazardous constituents thereof from being release to atmosphere would be desirable. FIG. 6 schematically represents a nonlimiting embodiment of such a system 60 for capturing and treating (removing) emissions released by a CIPP process, for example, the emissions 20 released at a job site as represented in FIG. 1. The system 60 is represented as capturing multi-phase emissions 20 (e.g., vapors, droplets, particulate, etc.) released from the end of a fibrous tube 14 placed in a portion of a host pipe 10 between a pair of manholes 12, as water, steam, and/or forced air 16 enters the tube 14 through one of the manholes 12 (located "upstream" in FIG. 6) for the purpose of curing the tube 14 (though other curing techniques may be used). The system 60 includes a hood 64 that directs the emissions 20 into piping 62 that is preferably constructed of one or more materials that are chemically resistant to chemicals and elements to which the system 60 will be exposed at CIPP job sites. The emissions 20 are forced into the piping 62 and hood 64 by the water, steam, and/or forced air 16, which may optionally be assisted by a vacuum pump (not shown) coupled to the piping 62. Plugs 68 or other suitable closures prevent the emissions 20 for flowing upstream or downstream from the manholes 12. The mixture of air and emissions 20 forced into the piping 62 pass through at least one condenser 70 that serves to condense the mixture and at least a portion of its constituents, in particular, water vapor in the emissions 20 prior to the remaining constituents in the emissions 20 being captured in a filtration system 72. Collection vessels 74 trap the resulting condensate (e.g., water) while the piping 62 transports uncondensed vapor to the filtration system 72. Water and potentially other condensate collected in the vessels 74 can be disposed of in any appropriate and permitted environmental manner, as can the remaining constituents of the emissions 20 captured in the filtration system 72. Suitable filter elements for the filtration system 72 include various sorbent materials. Once the filter elements reach their accepted capacity, they can be removed or replaced.

If so desired, the system 30 of FIG. 2 can be used in combination with the system 60 to detect and analyze the constituents of the emissions 20 and relative quantities of the constituents. For example, the inlet 36 to the pipe in FIG. 2 could be connected to the pipe 62 downstream of the condenser 64 to sample and analyze the emissions 20. Additional or alternatively, the gas stream 76 exiting the filtration system 72 could be analyzed to confirm the system 60 is working operationally. In addition, temperature, humidity, and/or air emission sensors could be placed at multiple locations on the system 60. The system 60 may be equipped to have a monitoring capability (real-time) to operate and monitor the performance of the system 60, with data uploaded to a data cloud (temperature, PID signal, humidity, etc.) for remote access.

While the invention has been described in terms of particular embodiments of monitoring systems, it should be apparent that alternatives could be adopted by one skilled in the art. For example, the systems, their components, and implementation could differ from what is described herein and shown in the drawings, functions of certain components of the systems could be performed by components of different construction but capable of a similar (though not necessarily equivalent) function, process parameters could be modified, and various materials could be used in the fabrication of the systems and their components. As such, it should be understood that the above detailed description is intended to describe the particular embodiments represented in the drawings and certain but not necessarily all features and aspects thereof, and to identify certain but not necessarily all alternatives to the represented embodiments and described features and aspects. As a nonlimiting example, the invention encompasses additional or alternative embodiments in which one or more features or aspects of the disclosed embodiments could be eliminated or combined. Accordingly, it should be understood that the invention is not necessarily limited to any embodiment described herein or illustrated in the drawings. It should also be understood that the phraseology and terminology employed above are for the purpose of describing the disclosed embodiments and investigations, and do not necessarily serve as limitations to the scope of the invention. Therefore, the scope of the invention is to be limited only by the following claims.

The invention claimed is:

1. A method of capturing and treating emissions during a cured-in-place pipe (CIPP) closed molding process in which a resin-impregnated fibrous material is placed within an existing fluid conduit and cured in situ to seal an opening in the conduit, the method comprising:
   capturing multi-phase emissions released by the resin-impregnated fibrous material during curing thereof, the capturing of the multi-phase emissions comprising installing closures in the fluid conduit to prevent the multi-phase emissions from flowing in the fluid conduit upstream and downstream from where the resin-impregnated fibrous material is placed and cured in situ;
   accumulating the multi-phase emissions that were captured during the capturing step;
   condensing at least a water portion of the multi-phase emissions that were accumulated during the accumulating step; and
   treating vapor constituents of the multi-phase emissions that were condensed during the condensing step.

2. The method according to claim 1, wherein the constituents comprise at least one of organic vapor, water vapor, particulate, and liquid droplets.

3. The method according to claim 1, wherein the constituents comprise at least one organic solvent.

4. The method according to claim 1, wherein the constituents comprise partially-cured resin particulate.

5. The method according to claim 1, wherein one of the constituents is styrene or tripropylene glycol diacrylate.

6. The method according to claim 1, the method further comprising detecting remaining constituents in an uncondensed vapor of the multi-phase emissions that remains after the condensing step, wherein the detecting step is performed with a photoionization detector.

7. The method according to claim 1, wherein the treating step comprises analyzing the vapor constituents of the multi-phase emissions.

8. The method according to claim 1, wherein the treating step comprises capturing and disposing of the vapor constituents of the multi-phase emissions.

9. The method according to claim 1, wherein the existing fluid conduit is a conduit of a sewer, storm water, water treatment, drinking water, remediation, or industrial system.

10. The method according to claim 1, wherein the closures include a plug, and the step of preventing includes plugging the fluid conduit downstream from where the resin-impregnated fibrous material is placed and cured in situ with the plug.

11. The method according to claim 10, wherein the closures include a second plug, and the step of preventing includes plugging the fluid conduit upstream from where the resin-impregnated fibrous material is placed and cured in situ with the second plug.

12. The method according to claim 11, wherein the resin-impregnated fibrous material is placed and cured in situ between a first access point in the fluid conduit and a second access point in the fluid conduit, and wherein the step of preventing includes plugging the fluid conduit upstream of the first access point and plugging the fluid conduit downstream of the second access point.

13. The method according to claim 12, wherein each of the first and second access points comprises a manhole.

14. The method according to claim 12, wherein the step of accumulating comprises capturing the multi-phase emissions with a hood covering the second access point.

15. A system for capturing and treating emissions during a cured-in-place pipe (CIPP) closed molding process in which a resin-impregnated fibrous material is placed within an existing fluid conduit and cured in situ to seal an opening in the conduit, the system comprising:
- means for capturing multi-phase emissions released by the resin-impregnated fibrous material during curing thereof, wherein the means for capturing includes a closure installed in the fluid conduit to prevent the multi-phase emissions from flowing downstream in the fluid conduit from where the resin-impregnated fibrous material is placed and cured in situ;
- means for accumulating the multi-phase emissions;
- means for condensing at least a water portion of the multi-phase emissions; and
- means for treating vapor constituents of the multi-phase emissions.

16. The system according to claim 15, wherein the treating means comprises means for analyzing the vapor constituents of the multi-phase emissions.

17. The system according to claim 15, wherein treating means comprises means for capturing and disposing of the vapor constituents of the multi-phase emissions.

18. The system according to claim 15, wherein the existing fluid conduit is a conduit of a sewer, storm water, water treatment, drinking water, remediation, or industrial system.

* * * * *